United States Patent
Frank

(10) Patent No.: US 6,904,081 B2
(45) Date of Patent: Jun. 7, 2005

(54) SPREAD SPECTRUM RECEIVER APPARATUS AND METHOD

(75) Inventor: Colin David Frank, Chicago, IL (US)

(73) Assignee: Motorola, Inc., Schaumburg, IL (US)

(*) Notice: Subject to any disclaimer, the term of this patent is extended or adjusted under 35 U.S.C. 154(b) by 172 days.

(21) Appl. No.: 10/231,833

(22) Filed: Aug. 30, 2002

(65) Prior Publication Data
US 2004/0042537 A1 Mar. 4, 2004

(51) Int. Cl.[7] .......................... H04B 15/00; H04K 1/00; H04L 27/30
(52) U.S. Cl. ....................... 375/152; 375/343
(58) Field of Search ............................. 375/316, 324, 375/340, 343, 130, 143, 152, 229, 232, 285, 348, 349, 350

(56) References Cited

U.S. PATENT DOCUMENTS

| 4,475,211 A | * | 10/1984 | Mattis et al. ............... 375/235 |
| 5,063,573 A | * | 11/1991 | Langewellpott ............. 375/232 |
| 5,303,263 A | * | 4/1994 | Shoji et al. ................. 375/229 |
| 5,345,472 A | * | 9/1994 | Lee ........................... 370/342 |
| 5,414,699 A | * | 5/1995 | Lee ........................... 370/342 |
| 6,175,588 B1 | * | 1/2001 | Visotsky et al. ............ 375/148 |
| 6,175,591 B1 | * | 1/2001 | Iwamatsu ................... 375/232 |
| 6,275,545 B1 | * | 8/2001 | Suzuki ....................... 375/343 |
| 6,278,732 B1 | * | 8/2001 | Beidas et al. ............... 375/235 |
| 6,314,147 B1 | * | 11/2001 | Liang et al. ................ 375/346 |
| 6,349,112 B1 | * | 2/2002 | Shibata ...................... 375/232 |
| 6,459,888 B1 | * | 10/2002 | Clark ......................... 455/266 |
| 6,545,990 B1 | * | 4/2003 | Amalfitano et al. ........ 370/335 |
| 6,608,874 B1 | * | 8/2003 | Beidas et al. ............... 375/353 |
| 2002/0159471 A1 | * | 10/2002 | Takakusaki et al. ........ 370/441 |

OTHER PUBLICATIONS

U. Madhow and M. Honig, "MMSE Interference Suppression for Direct–Sequence Spread–Spectrum CDMA," *IEEE Trans. on Comm.*, vol. 42, pp. 3178–3188, Dec. 1994.

* cited by examiner

Primary Examiner—Jean B. Corrielus

(57) ABSTRACT

A receiver (200) incorporates in parallel an adaptive minimum mean square error (MMSE) equalizer stage (202) and a matched filter stage (RAKE) (204). A selector (206) is utilized to accept data from one of the two stages based upon an operating condition of the receiver. The receiver may incorporate a single MMSE equalizer (202) for all channels in a spread spectrum communication channel.

10 Claims, 3 Drawing Sheets

SPREAD SPECTRUM RECEIVER APPARATUS AND METHOD

TECHNICAL FIELD

This patent relates to receivers for use in a spread spectrum communication system.

BACKGROUND

In a spread spectrum communication system, downlink transmissions from a base station to a mobile station include a pilot channel and a plurality of traffic channels. The pilot channel is decoded by all users. Each traffic channel is intended for decoding by a single user. Therefore, each traffic channel is encoded using a code known by both the base station and the mobile station. The pilot channel is encoded using a code known by the base station and all mobile stations. Spread spectrum encoding of the pilot and traffic channels spreads the bandwidth of transmissions in the system.

One example of a spread spectrum communication system is a cellular radiotelephone system according to Telecommunications Industry Association/Electronic Industry Association (TIA/EIA) Interim Standard IS-95, "Mobile Station-Base Station Compatibility Standard for Dual-Mode Wideband Spread Spectrum Cellular System" (IS-95). Individual users in the system use the same frequency but are distinguishable from each other through the use of individual spreading codes. IS-95 is an example of a direct sequence code division multiple access (DS-CDMA) communication system. In a DS-CDMA system, transmissions are spread by a pseudorandom noise (PN) code. Data is spread by chips, where the chip is the spread spectrum minimal-duration keying element.

Other spread spectrum systems include radiotelephone and data systems operating at various frequencies and utilizing various spreading techniques. Among these additional systems are third-generation spread spectrum communication systems (3G) and wideband code division multiple access systems (W-CDMA).

Mobile stations for use in spread spectrum communications systems have employed RAKE receivers. A RAKE receiver is a form of a matched filter receiver that includes one or more receiver fingers independently receiving radio frequency (RF) signals. Each finger despreads the traffic channel to form estimates of the traffic symbols. Each finger also despreads and filters the pilot channel to form estimates of the channel gain and phase corresponding to the finger. The traffic symbol estimates of the receiver fingers are combined to produce a received signal. A RAKE receiver combines multipath rays using the complex conjugate of the channel estimates and thereby exploits channel diversity. Generally, the RAKE receiver fingers are assigned to the strongest set of multipath rays.

A limitation on the performance of a RAKE receiver is multiple-access interference or noise at the receiver. Generally, there are two sources of multiple-access interference on the forward link, i.e., from the base station to the mobile station. The first source of interference, typically referred to as intra-cell interference, is the signal originating from the same sector of the same base station as the signal of interest, and results from multipath in the channel between the transmitter and the mobile. The multipath destroys the orthogonality of the transmitted signal, so that signals transmitted to other mobiles interfere with the signal of interest. The second source of multiple-access interference is interference from other sectors, both those sectors in soft-handoff with the mobile station and those not in soft-handoff with the mobile station. The signals transmitted from neighboring sectors are not orthogonal with the signal of interest, regardless of channel, so some multiple-access interference is always introduced at the receiver. Under these conditions, the RAKE receiver performance is limited by multiple access interference.

An alternative structure that may be used as a receiver in a DS-CDMA system is a minimum mean square error (MMSE) equalizer. A receiver based on an MMSE equalizer (MMSE receiver) is disclosed and described in commonly-assigned U.S. Pat. No. 6,175,588, the disclosure of which is hereby expressly incorporated herein by reference. A MMSE receiver can effectively suppress both intra-cell ($I_{or}$) and other-cell ($I_{oc}$) multiple-access interference on a DS-CDMA downlink. As a result, depending on the specific channels and on the ratio of $I_{oc}/I_{or}$, the performance of the MMSE receiver can be in excess of several decibels (dB) better than the RAKE receiver. In DS-CDMA systems gains are important because the link capacity scales with the inverse of the signal-to-noise ratio required to support the link.

A problem of the MMSE receiver is that adaptive implementations (least mean square "LMS", recursive least square "RLS", or multi-stage Wiener) have difficulty tracking high-speed Doppler. Furthermore, if the equalizer does not adequately track the channel, the performance of the equalizer can be worse than the performance of the RAKE receiver, which is very robust.

Thus, there is a need for a spread spectrum receiver that adapts the advantages of a RAKE receiver and an MMSE receiver in an efficient architecture.

DETAILED DESCRIPTION

A receiver incorporates in parallel an adaptive minimum mean square error (MMSE) equalizer stage and a matched filter stage (RAKE). A selector is utilized to accept data from one of the two stages based upon an operating condition of the receiver, such as the Doppler frequency of the channel fading process. The receiver may incorporate a single MMSE equalizer for all code channels in a spread spectrum communication channel.

In another embodiment, a receiver incorporates in parallel an adaptive MMSE equalizer stage and a RAKE stage. The MMSE equalizer stage and the RAKE stage share a shift register, utilize a common vector $x^k$ and train using a pilot channel.

The selector may use one or more of a number of criteria for selection of the MMSE equalizer stage output and the RAKE stage output. It may be possible to decode the output of both stages, in which case frame error rate estimates, bit error rate estimates or CRC's or a combination thereof may be used to select between the two stages. Alternatively, estimates of the signal-to-noise ratio at the output of the two stages may be used to select between the two stages. Still further, the Doppler frequency of the channel fading process may be estimated and compared to the maximum Doppler that can be tracked by adaptive (LMS, RLS, or multi-stage Weiner) MMSE receiver. Combinations of these methods may be used to select between the two stages.

Figure 1:
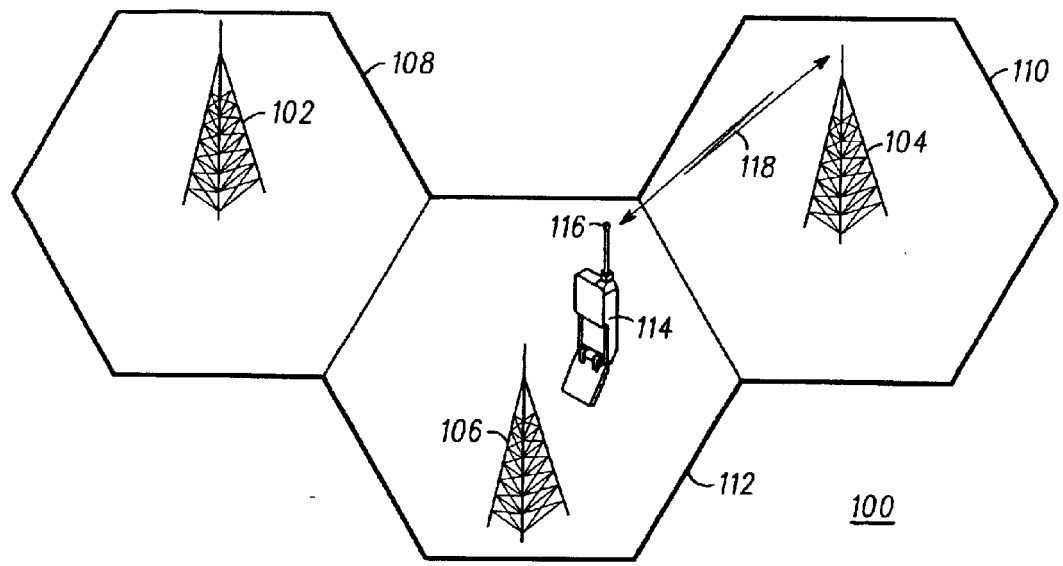
FIG. 1 is a block diagram of a communication system.

Referring to FIG. 1 a communication system 100 includes base stations 102, 104 and 106 providing coverage areas 108, 110 and 112, respectively, and one or more mobile stations, one of which is shown as mobile station 114. Base stations 102, 104 and 106 include, among other things, a processor, a memory and a transceiver (not depicted) that transmits coded communication signals to and receives coded communication signals from (collectively coded communication signals 118) the mobile station 114 via an antenna 116. Each mobile station 114 also includes a processor and a memory and a transceiver (not depicted) for receiving coded communication signals from and transmitting coded communication signals to one or more of the base stations 102, 104 and 106. The coded communication signals 118 may be spread spectrum, direct sequence code division multiple access (DS-CDMA) communication signals including a pilot signal and a traffic signal. As is well know for a communication system such as communication system 100, each of the base stations 102, 104 and 106 may be coupled to various network elements including without limitation a base station controller, a mobile switch, and a public switched telephone network (not depicted). The network elements may operate as circuit switched elements, as packet data elements or combinations thereof.

Figure 2:
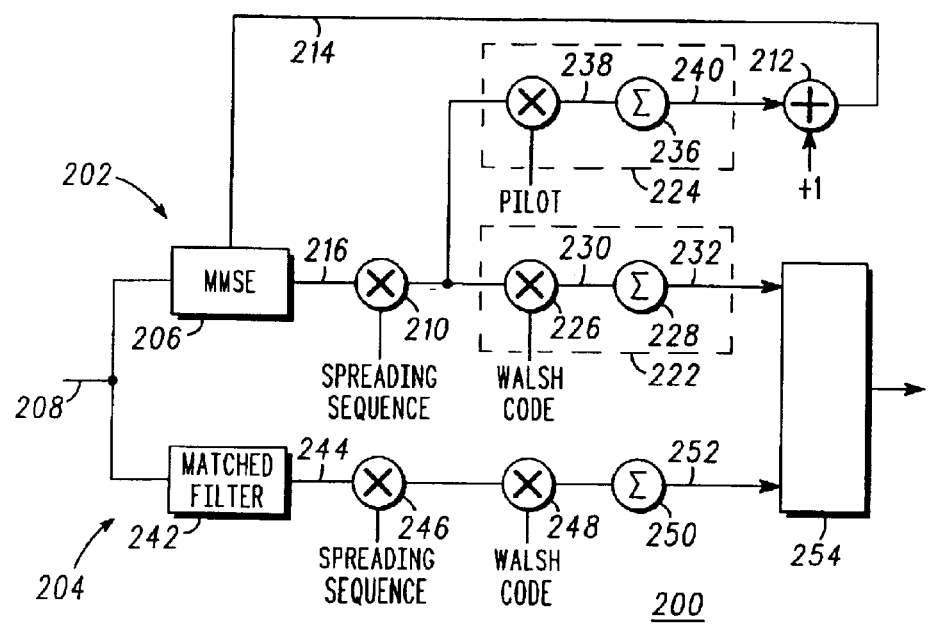
FIG. 2 is a block diagram of a receiver according to an embodiment.

Referring to FIG. 2, a transceiver 200 includes a first stage 202 and a second stage 204 in parallel. The first stage 202 is an adaptive MMSE equalizer stage and includes an adaptive MMSE equalizer 206 coupled to a received signal input 208. The received signal input 208 is a received RF signal that is preconditioned using suitable front-end processing such as intermediate frequency demodulation, analog automatic gain control (AGC), and analog-to-digital conversion (A/D). The MMSE equalizer 206 may be configured to maximize signal-to-noise ratio at the output of the demodulator for the channel or channels of interest. The despreader 210 despreads the output 216 of the MMSE equalizer based upon the spreading sequence 218. The despread signal 220 is provided to a traffic channel demodulator 222 and to a pilot channel demodulator 224. The traffic channel demodulator 222 includes a despreader 226 that despreads the signal 220 based upon the appropriate Walsh code for the traffic channel of interest, and the correlator 228 correlates the chips 230 over an interval, such as 64 chips, to produce demodulated traffic data 232. The pilot channel demodulator 224 includes a despreader 234 that despreads the signal 220 based upon the pilot code, and the correlator 236 correlates the chips 238 over the interval to produce demodulated pilot channel data 240. The pilot channel data 240 may be used to train the MMSE equalizer 206 by generating an error signal 214, which is the sum produced by adding at adder 212 the pilot channel, i.e., all 1s.

The second stage 204 of the receiver 200 is a matched filter (RAKE) stage that operates in a well known manner. The second stage 204 includes a matched filter 242, the output 244 of which is despread by despreader 246 based upon the spreading sequence and by despreader 248 based upon the Walsh code for the traffic and/or pilot channel. The summer 250 sums the chips over a suitable interval to provide demodulated data 252.

The demodulated data 232 and 252 are coupled to a selector 254. The selector operates to select one of the two streams of demodulated data for further processing consistent with operation of the communication system 100. The selector 254 may use one or more of a number of criteria for selection of the demodulated data 232 and 252. For example, the selector 254 may decode each of the demodulated date 232 and 252 and may estimate such values as frame error rate and bit error rate or may calculate a cyclical redundancy check (CRC), or may perform a combination thereof to select between the two. Alternatively, estimates of the signal-to-noise ratio at the output of the two stages may be used to select between the demodulated data of the two stages 202 and 204.

The matched filter stage 204 may also be adapted with a pilot channel demodulator (not shown), similar in construction and operation as the pilot channel demodulator 224. The quality of the pilot symbol estimates for the matched filter stage 204 can then be compared with the quality of the pilot symbol estimates for the MMSE stage 202 in order to choose between the MMSE stage 202 and matched filter stage 204. In this particular embodiment, the pilot symbols estimates for the MMSE stage 202 and matched filter stage 204 would both be put into the selection box 254. Alternatively, the pilot symbol estimates could be put into a SNR estimation box and SNR estimate produced by this box can be put into the section box 254.

Still further, the Doppler frequency of the channel fading process may be estimated and compared to a threshold corresponding to the maximum Doppler which can be adequately tracked by the adaptive (least-mean squares, recursive least squares, or multi-stage Weiner filter) MMSE stage 202. If the estimated Doppler frequency exceeds the threshold, the output of the RAKE (matched-filter) stage 204 is used; otherwise, the output of the MMSE stage 202 is used.

Figure 3:
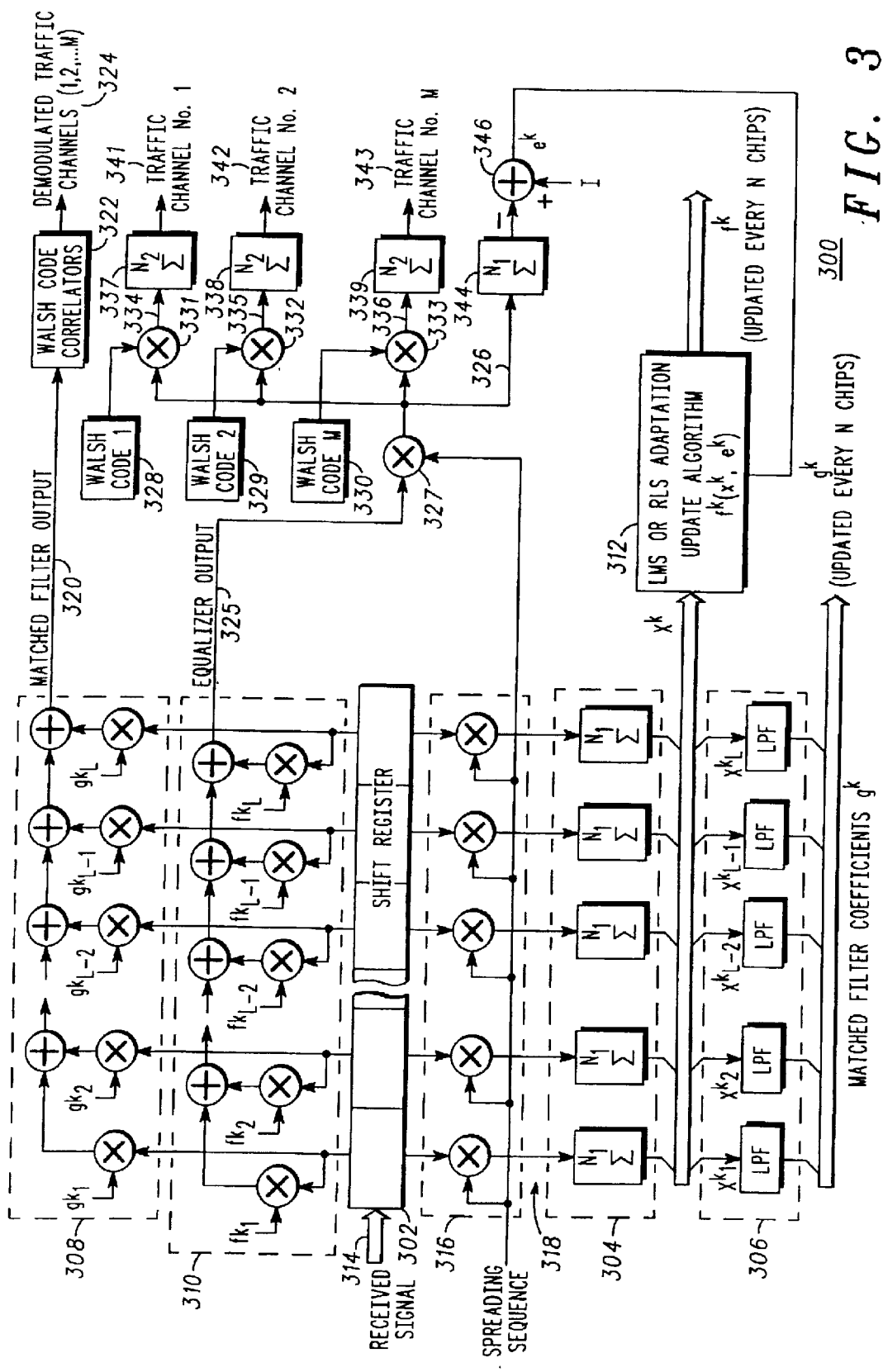
FIG. 3 is a block diagram of a receiver according to an additional embodiment.

In FIG. 2, the two stages 202 and 204 are shown as discrete stages; however, they need not be. Referring to FIG. 3, a receiver 300 includes shift register 302, correlator 304, a filter 306, a matched filter 308, an adaptive MMSE equalizer 310 and an adaptation algorithm process 312. A received, preconditioned signal 314 is sampled at a suitable integer multiple n of the chip rate, such as twice the chip rate, and shifted into the shift register 302 n samples at a time. Each of the n samples (not individually identified) from the shift register 302 is despread using the spreading sequence by a despreader 316 to provide n respective despread samples 318. The despread samples are then respectively correlated within correlator 304 to provide a correlation vector $x^k$, having elements $x^k_1, x^k_2, \ldots, x^k_L$, where L is the number of equalizer taps. The correlation vector $x^k$ is provided to the adaptation algorithm 312, which generates the coefficients $f^k$, having elements $f^k_1, f^k_2, \ldots, f^k_L$, for MMSE equalizer 310. The coefficients $f^k$ may be determined using a least mean square "LMS", recursive least square "RLS", or multi-stage Weiner adaptation, and as described in the afore-mentioned U.S. Pat. No. 6,175,588 they are a function of the correlation vector $x^k$ and the error signal $e^k$, described below. The coefficients $f^k$ may be updated every N chips, or as otherwise suitably determined. Other suitable adaptation algorithms may be employed depending on the desired output of the MMSE equalizer 310. As noted above, one possible configuration for the MMSE equalizer minimizes the sum interference due to both intra-cell ($I_{or}$) and other-cell ($I_{oc}$) multiple access interference.

The correlation vector $x^k$ is further low pass filtered in filter 306 to generate the matched filter coefficients $g^k$ having elements $g^k_1, g^k_2, \ldots, g^k_L$. A non-causal filter may be used to estimate $g^k$ The matched filter coefficients may be updated every N chips, or as otherwise determined to be suitable.

The n samples from the shift register 302 are likewise coupled to the matched filter 308 and the MMSE equalizer 310. The matched filter 308 provides a matched filter output 320 to at least one Walsh code correlator 322 to provide demodulated traffic channels (traffic channels 1-M) 324 as is well known. In other words, the matched filter 308 and the Walsh code correlator 322 operate as a RAKE receiver for demodulating one or more traffic channels 324 from the received signal 314. The receiver 300 may be further adapted to demodulate the pilot channel data by adding a pilot channel correlator (not depicted) to the output of the matched filter output 320. The quality (signal-to-noise ratio or signal-to-interference ratio) of the pilot symbol estimates at the output of the Rake (matched-filter) and MMSE receivers can be compared as part of the selection process between the MMSE and matched filter receiver outputs.

The output 325 of the MMSE equalizer 310 is despread based upon the spreading sequence by despreader 327 to provide an equalized despread signal 326. Depending on the number of traffic channels, the equalized despread signal 326 is then despread based upon the respective Walsh traffic codes 328–330 by despreaders 331–333 to provide respective despread traffic signals 334–336. The despread traffic signals 334–336 are then correlated using correlators 337–340 to provide corresponding traffic channel (for traffic channels 1-M) data 341–343. The equalized despread signal 326 is further correlated in correlator 344 and summed by summer 346 with the pilot code (all "1s") to provide the error signal ek, which, as described, is used to determine the MMSE equalizer 310 coefficients.

Thus, FIG. 3 illustrates an embodiment wherein a matched filter (RAKE) receiver and a MMSE equalizer receiver architecture are efficiently combined. The receiver 300 employs a common shift register to provide the correlation vector $x^k$, which is used to determine both the MMSE equalizer coefficients $f^k$ and matched filter coefficients/ channel estimate $g^k$. Additionally, a single MMSE equalizer 310 is used in combination with parallel Walsh despreaders 331–333 and correlators 337–340.

Figure 4:
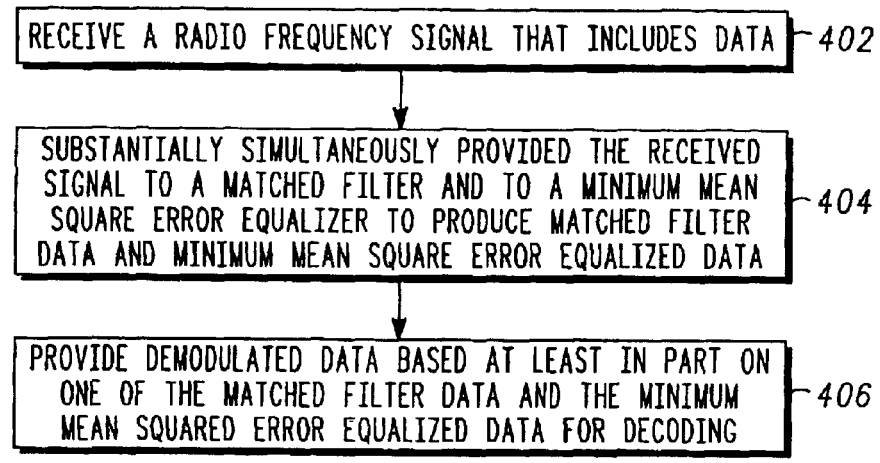
FIG. 4 is a flow diagram illustrating a method of providing demodulated data.

Referring to FIG. 4, a method 400 of providing demodulated data begins at step 402 with the step of receiving a radio frequency signal that includes data. At step 404, the data is substantially simultaneously provided data to both a matched filter to provide matched filter data and a minimum mean squared error equalizer to provide minimum mean squared error equalized data. At step 406, demodulated data is provided based on at least one of the matched filter data and the minimum mean squared error equalized data for decoding.

This patent describes several specific embodiments. However, one of ordinary skill in the art will appreciate that various modifications and changes can be made to these embodiments. Accordingly, the specification and drawings are to be regarded in an illustrative rather than restrictive sense, and all such modifications are intended to be included within the scope of the present patent.

I claim:

1. An apparatus comprising:
   a shift register having a first input and a first output, the first input coupled to a received signal;
   a minimum mean square equalizer having a second input and a second output, the second input coupled to the first output;
   a matched filter having a third input and a third output, the third input coupled to the first output; and
   a selector coupled to the second and third outputs, the selector having a first and second position and responsive to a selection criteria, wherein one of the second and third outputs is selected for further processing.

2. The apparatus of claim 1 wherein the first output comprises a matched filter coefficients output.

3. The apparatus of claim 1 wherein the minimum mean square equalizer comprising equalizer taps, the equalizer taps having an input coupled to an adaptive algorithm process and the equalizer taps having an equalizer coefficients output coupled to generate the second output of the minimum mean square equalizer.

4. The apparatus of claim 3 wherein the adaptive algorithm process comprises one of a least mean square process, a recursive least squares process, and a multi-stage Weiner filter.

5. The apparatus of claim 1 wherein the selector is operable based upon at least one of a frame error rate estimate, bit error rate estimate, cyclical redundancy check, signal-to-noise ratio, and Doppler frequency estimate of a channel fading process.

6. The apparatus of claim 1 wherein the minimum mean square error equalizer is coupled to a plurality of channel demodulators.

7. The apparatus of claim 6, wherein at least one of the plurality of channel demodulators is a pilot channel demodulator.

8. A method for processing a received radio frequency signal that includes data, the method comprising:
   coupling the radio frequency signal to an input of a shift register;
   providing the data from an output of the shift register to a matched filter;
   coupling the outputs of the minimum mean square equalizer to a selector, the selector having a first and a second position and responsive to a selection criteria, wherein one of the outputs of the minimum mean square equalizer and the matched filter responsive to said selection criteria is selected for decoding.

9. The method of claim 8 wherein the selecting the data for decoding comprises selecting the data for decoding based on one of a frame error rate estimate, bit error rate estimate, cyclical redundancy check, signal-to-noise ratio, and Doppler frequency estimate of a channel fading process.

10. The method of claim 8 further comprising means for adapting the minimum mean squared equalizer.

* * * * *